(12) United States Patent
Xu et al.

(10) Patent No.: US 9,544,038 B2
(45) Date of Patent: Jan. 10, 2017

(54) METHOD, DEVICE AND SYSTEM FOR SIGNALLING TRANSMISSION OF VIRTUAL MULTI-ANTENNA SYSTEM

(71) Applicant: ZTE Corporation, Shenzhen, Guangdong (CN)

(72) Inventors: Jin Xu, Shenzhen (CN); Yu Ngok Li, Shenzhen (CN); Jun Xu, Shenzhen (CN); Liujun Hu, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/894,736

(22) PCT Filed: Apr. 16, 2014

(86) PCT No.: PCT/CN2014/075531
§ 371 (c)(1),
(2) Date: Nov. 30, 2015

(87) PCT Pub. No.: WO2014/190820
PCT Pub. Date: Dec. 4, 2014

(65) Prior Publication Data
US 2016/0112109 A1    Apr. 21, 2016

(30) Foreign Application Priority Data

May 31, 2013    (CN) .......................... 2013 1 0213774

(51) Int. Cl.
*H04B 7/02*    (2006.01)
*H04B 7/06*    (2006.01)
*H04B 7/04*    (2006.01)

(52) U.S. Cl.
CPC .......... *H04B 7/0626* (2013.01); *H04B 7/0417* (2013.01); *H04B 7/0452* (2013.01)

(58) Field of Classification Search
CPC ........... H04B 7/06; H04B 7/04; H04B 7/0626; H04B 7/0417; H04B 7/0619; H04B 7/0632; H04B 7/024
See application file for complete search history.

(56) References Cited

U.S. PATENT DOCUMENTS 7,483,406 B2    1/2009    Cleveland
9,025,550 B2 *  5/2015    Zhu ........................ H04L 5/0035
                                                    370/252

(Continued)

FOREIGN PATENT DOCUMENTS

CN    1947358 A       4/2007
CN    102938688 A     2/2013

(Continued)

OTHER PUBLICATIONS

International Search Report in international application No. PCT/CN2014/075531, mailed on Jul. 18, 2014.

(Continued)

*Primary Examiner* — Khanh C Tran
(74) *Attorney, Agent, or Firm* — Oppedahl Patent Law Firm LLC

(57) ABSTRACT

Disclosed are a method, device and system for signalling transmission in a virtual multi-antenna system. The method includes N terminals receive CSI-RSs from a Node B, N being a positive integer larger than or equal to 2; and one terminal in M terminal(s) calculates channel related information from the Node B to the terminal according to the received CSI-RS, and sends the channel related information to L terminal(s), wherein the M terminal(s) form(s) a subset of the N terminals, M is smaller than or equal to N and larger than or equal to 1, and L is smaller than or equal to N and larger than or equal to 1. A first sending unit in the device is configured to calculate channel related information from a Node B to one terminal in M terminal(s) according to a (Continued)

---

101: N terminals receive CSI-RSs from a Node B

102: one terminal in M terminal(s) calculates channel related information about a channel from the Node B to the one terminal in the M terminal(s) according to the received CSI-RS, and sends the channel related information to L terminal(s)

CSI-RS received by the terminal, and send the channel related information to L terminal(s).

11 Claims, 5 Drawing Sheets

(56) References Cited

U.S. PATENT DOCUMENTS

| | | | |
|---|---|---|---|
| 9,276,646 B2* | 3/2016 | Chu | H04B 7/024 |
| 2005/0243756 A1 | 11/2005 | Cleveland | |
| 2011/0176581 A1* | 7/2011 | Thomas | H04B 1/7075 |
| | | | 375/146 |
| 2013/0102304 A1* | 4/2013 | Lee | H04W 24/00 |
| | | | 455/422.1 |
| 2013/0315195 A1 | 11/2013 | Ko | |
| 2015/0045078 A1* | 2/2015 | Lee | H04W 76/021 |
| | | | 455/509 |
| 2015/0373730 A1* | 12/2015 | Fujishiro | H04L 1/0003 |
| | | | 455/450 |

FOREIGN PATENT DOCUMENTS

| | | |
|---|---|---|
| CN | 103095399 A | 5/2013 |
| WO | 2012108716 A2 | 8/2012 |
| WO | 2013024350 A2 | 2/2013 |

OTHER PUBLICATIONS

English Translation of the Written Opinion of the International Search Authority in international application No. PCT/CN2014/075531, mailed on Jul. 18, 2014.

* cited by examiner

METHOD, DEVICE AND SYSTEM FOR SIGNALLING TRANSMISSION OF VIRTUAL MULTI-ANTENNA SYSTEM

TECHNICAL FIELD

The present disclosure relates to the field of communications, and in particular to a method, device and system for signalling transmission in a virtual multi-antenna system.

BACKGROUND

In a wireless communication technology, when a Node B, for example, an Evolved Node B (eNB), sends data by multiple antennae, a data transmission rate may be increased in a space multiplexing manner, that is, a sender sends different data at different antenna locations by the same time-frequency resources, and a receiver, for example, User Equipment (UE), also receives the data by multiple antennae. As shown in FIG. 1, when a Node B is to send downlink data to terminals A, B, C and D in a cell, if an existing downlink transmission manner is adopted, the Node B needs to allocate different channel resources to A, B, C and D; and the Node B may adopt a Single User Multiple-Input Multiple-Output (SU-MIMO) manner to improve transmission efficiency. Under a single-user condition, resources of all antennae are allocated to the same user, the user is in possession of all the physical resources allocated by a Node B side in a transmission interval, and such a transmission manner is called SU-MIMO; while under a multiple-user condition, space resources of different antennae are allocated to different users, one user shares the physical resources allocated by the Node B side with at least one of other users in a transmission interval, a sharing manner may be a space division multiple access manner or a space division multiplexing manner, and such a transmission manner is called Multiple User Multiple-Input Multiple-Output (MU-MIMO), wherein the physical resources allocated by the Node B side refer to time-frequency resources.

In a Long Term Evolution (LTE) system, downlink physical Channel State Information (CSI) are reflected by three ways: a Channel Quality Indicator (CQI), a Pre-coding Matrix Indicator (PMI) and a Rank Indicator (RI).

A CQI is an index for determining quality of a downlink channel. In an existing technology, a CQI is represented by integral values from 0 to 15, representing different CQI levels respectively, different CQIs correspond to respective Modulation and Coding Schemes (MCSs), and there are totally 16 conditions which may be represented by 4-bit information.

A PMI refers to notifying an eNB of a pre-coding matrix for pre-coding a Physical Downlink Shared Channel (PDSCH) sent to UE according to measured channel quality in a closed loop space multiplexing sending mode only. Feedback granularity of the PMI may be feeding back the PMI in the whole bandwidth, or may also be feeding back the PMI according to sub-bands.

An RI is configured to describe the number of spatial independent channels, and corresponds to a rank of a channel response matrix. UE is required to feed back RI information in open loop space multiplexing and closed loop space multiplexing modes, and is not required to feed back the RI information in other modes. The rank of the channel matrix corresponds to the number of layers, so that the RI information fed back to an eNB by the UE is the number of the layers for downlink transmission.

A transmission layer has the meaning of "layer" under a multi-antenna condition in LTE and Long Term Evolution-Advanced (LTE-A), and represents the number of available independent channels in space multiplexing. The total number of transmission layers is a rank of a spatial channel. In an SU-MIMO mode, resources of all antennae are allocated to the same user, and the number of layers for transmitting MIMO data is equal to the rank adopted for transmitting the MIMO data by the eNB; while in an MU-MIMO mode, the number of layers for transmission of one user is smaller than the total number of the layers for transmitting the MIMO data by the eNB, and the eNB is required to notify different control data to the UE in different transmission modes for switching between the SU-MIMO mode and the MU-MIMO mode.

In a practical communication system, a Node B may adopt multiple transmitting and receiving antennae, while there may usually not be many antennae configured on a terminal of a user side under the limits of a factor such as a size and cost of the terminal, which may cause incomplete utilization of advantages of a MIMO technology.

An uplink virtual MIMO method disclosed at present is to combine multiple users to form virtual MIMO channels in the same time-frequency resource to jointly send data to a Node B with multiple antennae. When distances between the users are large enough, the channels for different users to reach the Node B may be considered to be uncorrelated, so that issue related to the size and the cost is addressed.

Virtual MIMO is divided into cooperative virtual MIMO and non-cooperative virtual MIMO. A main thought of cooperative virtual MIMO is that data may be shared between users and the antennae of respective users are shared to form a virtual multi-antenna system, and an existing uplink cooperative virtual MIMO technology mainly realizes a diversity function of MIMO; and non-cooperative virtual MIMO refers to that users may not share data but send independent data streams to a Node B respectively, the Node B selects some users for pairing according to channel conditions of the users, the paired users send data to the Node B in the same time-frequency resource, and the Node B distinguishes different users through multiple antennae, which is similar to that of downlink MU-MIMO, and non-cooperative virtual MIMO mainly realizes a multiplexing function of MIMO.

A virtual MIMO technology at the present stage is usually suggested for an uplink for a mobile terminal to send data to a Node B, and a non-cooperative manner is mainly adopted.

Device to Device (D2D) communication is a technology for direct communication between terminals, and its main characteristic is that: a certain device in multiple close devices covered by a network may find other devices in a wireless manner and realize direct connection and communication with the other devices. In D2D communication, resources are shared with cell users under the control of a cell network, so that a utilization rate of a frequency spectrum may be increased. In addition, D2D communication also has the advantages of: reducing a burden of a cellular network, reducing power consumption of a battery of a mobile terminal, increasing a bit rate, improving robustness of a failure of a network infrastructure and the like, and further supporting novel small-scale point-to-point data service.

Downlink virtual MIMO may allow sharing of receiving antennae of multiple users to form a virtual SU-MIMO receiver, and because of less interlayer interference, SU-MIMO may achieve higher link performance and higher downlink throughput compared with MU-MIMO, which is great for improving a communication condition of a hot spot with densely distributed users. However, downlink virtual MIMO is essentially cooperative virtual MIMO, and the terminals are required to share information received from a Node B and jointly perform demodulation and decoding. Since an existing mobile communication network architecture does not support data sharing between users, two processes are required for data interaction between users: 1, each user sends data to a Node B through an uplink channel respectively; and 2, the Node B forwards the data to the users in downlink channels. In such interaction processes, the antenna data may not be effectively shared between the users, so that an existing downlink virtual MIMO technology is not taken full advantage in a mobile communication system.

For the problem of incapability of an existing mobile communication network in effectively supporting a downlink virtual MIMO technology, there is yet no effective solution.

SUMMARY

In view of this, the embodiments of the present disclosure provide a method, device and system for signalling transmission in a virtual multi-antenna system, which may solve the problem of incapability of an existing mobile communication network in effectively supporting a downlink virtual MIMO technology, implement antenna sharing between users and improve a network congestion condition.

The technical solutions of the present disclosure are implemented as follows.

A method for signalling transmission in a virtual multi-antenna system is provided, which includes:

N terminals receive Channel State Information Reference Signals (CSI-RSs) from a Node B, N being a positive integer larger than or equal to 2; and one terminal in M terminal(s) calculates channel related information about a channel from the Node B to the one terminal in the M terminal(s) according to the CSI-RS received by the one terminal in the M terminal(s), and sends the channel related information to L terminal(s), wherein the M terminal(s) form(s) a subset of the N terminals, M is smaller than or equal to N and larger than or equal to 1, and L is smaller than or equal to N and larger than or equal to 1.

Furthermore, the channel related information may include at least one of: channel information, CSI and the CSI-RS.

A method for signalling transmission in a virtual multi-antenna system is provided, which includes:

L terminal(s) receive channel related information from one terminal in M terminal(s), and calculate comprehensive CSI according to the channel related information; and the L terminal(s) feed(s) back the comprehensive CSI to a Node B, or the L terminal(s) forward(s) the comprehensive CSI to one terminal in N terminals, and the one terminal in the N terminals feeds back the comprehensive CSI to the Node B, wherein L is smaller than or equal to N and larger than or equal to 1, M is smaller than or equal to N and larger than or equal to 1, the M terminal(s) form(s) a subset of the N terminals, the N terminals are configured to receive CSI-RSs from the Node B, and N is a positive integer larger than or equal to 2.

Furthermore, when the L terminal(s) form(s) a subset of the N terminals, each terminal in the L terminal(s) may receive the channel related information from the M terminal (s).

Furthermore, when the L terminal(s) form(s) a subset of the N terminals and L is equal to 1, one terminal in the N terminals may receive the channel related information from the M terminal(s).

Furthermore, when the L terminal(s) are/is terminal(s) except the N terminals and L is equal to 1, the one terminal except the N terminals may receive the channel related information from the M terminal(s).

Furthermore, the one terminal except in the N terminals may be a centralized processing device not connected to a current mobile communication network.

Furthermore, the channel related information may include at least one of: channel information, CSI and the CSI-RS.

A device for signalling transmission in a virtual multi-antenna system is provided, which is located on a terminal side, the device including:

a first receiving unit, configured to receive CSI-RSs from a Node B, N being a positive integer larger than or equal to 2; and a first sending unit, configured to calculate channel related information about a channel from the Node B to one terminal in M terminal(s) by the one terminal in the M terminal(s) according to the CSI-RS received by the one terminal in the M terminal(s), and send the channel related information by the one terminal in the M terminal(s) to L terminal(s), wherein the M terminal(s) form(s) a subset of the N terminals, M is smaller than or equal to N and larger than or equal to 1, and L is smaller than or equal to N and larger than or equal to 1.

When the first receiving unit and the first sending unit execute processing, they may be implemented by a Central Processing Unit (CPU), a Digital Signal Processor (DSP) or a Field-Programmable Gate Array (FPGA).

Furthermore, the channel related information may include at least one of: channel information, CSI and the CSI-RS.

A device for signalling transmission in a virtual multi-antenna system is provided, which is located on a terminal side, the device including:

a second receiving unit, configured to receive channel related information from one terminal in M terminal(s) by L terminal(s), and calculate comprehensive CSI by the L terminal(s) according to the channel related information, L being smaller than or equal to N and larger than or equal to 1; and a second sending unit, configured to feed back the comprehensive CSI to a Node B by the L terminal(s), or forward the comprehensive CSI to one terminal in N terminals by the L terminal(s), and feed back the comprehensive CSI to the Node B by the one terminal in the N terminals, wherein M is smaller than or equal to N and larger than or equal to 1, the M terminal(s) form(s) a subset of the N terminals, the N terminals are configured to receive CSI-RSs from the Node B, and N is a positive integer larger than or equal to 2.

When the second receiving unit and the second sending unit execute processing, they may be implemented by a CPU, a DSP or an FPGA.

Furthermore, the second receiving unit may be further configured to, when the L terminal(s) form(s) a subset of the N terminals, receive the channel related information from the M terminal(s) by each terminal in the L terminal(s).

Furthermore, the second receiving unit may be further configured to, when the L terminal(s) form(s) a subset of the N terminals and L is equal to 1, receive the channel related information from the M terminal(s) by one terminal in the N terminals.

Furthermore, the second receiving unit may be further configured to, when the L terminal(s) are/is terminal(s)

except the N terminals and L is equal to 1, receive the channel related information from the M terminal(s) by the one terminal except the N terminals.

Furthermore, the one terminal except in the N terminals may be a centralized processing device not connected to a current mobile communication network.

Furthermore, the channel related information may include at least one of: channel information, CSI and the CSI-RS.

A virtual multi-antenna system is provided, which includes:

a first sending unit, configured to calculate channel related information about a channel from a Node B to one terminal in M terminal(s) by the one terminal in the M terminal(s) according to a CSI-RS received by the one terminal in the M terminal(s), and send the channel related information one terminal in the M terminal(s) to L terminal(s), wherein the M terminal(s) form(s) a subset of N terminals, MM is smaller than or equal to N and larger than or equal to 1, and L is smaller than or equal to N and larger than or equal to 1; and a second receiving unit, configured to receive the channel related information from the one terminal in the M terminal(s) by the L terminal(s), and calculate comprehensive CSI by the L terminal(s) according to the channel related information, L being smaller than or equal to N and larger than or equal to 1.

When the first sending unit and the second receiving unit execute processing, they may implemented by a CPU, a DSP or an FPGA.

According to the method of the embodiment of the present disclosure, the N terminals receive the CSI-RSs from the Node B, N being a positive integer larger than or equal to 2; and one terminal in the M terminal(s) calculates the channel related information about a channel from the Node B to the one terminal in the M terminal(s) according to the received CSI-RS, and sends the channel related information to L terminal(s), wherein the M terminal(s) form(s) a subset of the N terminals, M is smaller than or equal to N and larger than or equal to 1, and L is smaller than or equal to N and larger than or equal to 1.

By the embodiments of the present disclosure, one terminal in M terminal(s) calculates channel related information about a channel from the Node B to the one terminal in the M terminal(s) according to the CSI-RS received by the one terminal in the M terminal(s), and the channel related information is sent to L terminal(s) to calculate comprehensive CSI, so that antenna sharing between users may be implemented, and the network congestion condition may be improved.

DETAILED DESCRIPTION

For the problem of incapability of an existing mobile communication network in effectively supporting a downlink virtual MIMO technology, the present disclosure discloses a novel signalling transmission solution for a virtual multi-antenna system, so as to effectively implement antenna sharing between users, increase data throughput of a hot spot and improve a network congestion condition by fully utilizing the downlink virtual MIMO technology.

Implementation of the technical solutions is further described below with reference to the drawings in detail.

An embodiment of the present disclosure mainly includes the following contents.

Figure 1:
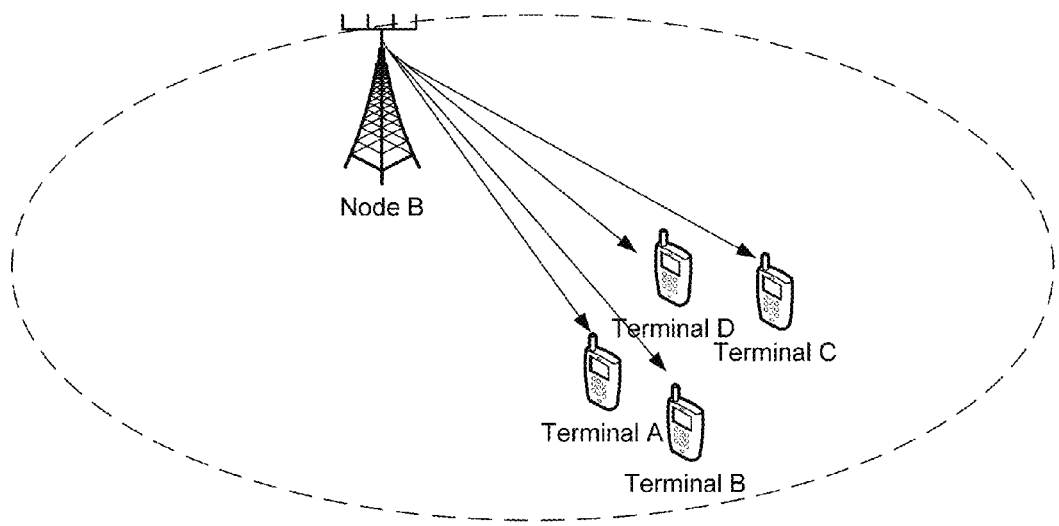
FIG. 1 is a diagram of downlink transmission of an existing homogeneous network.
Figure 2:
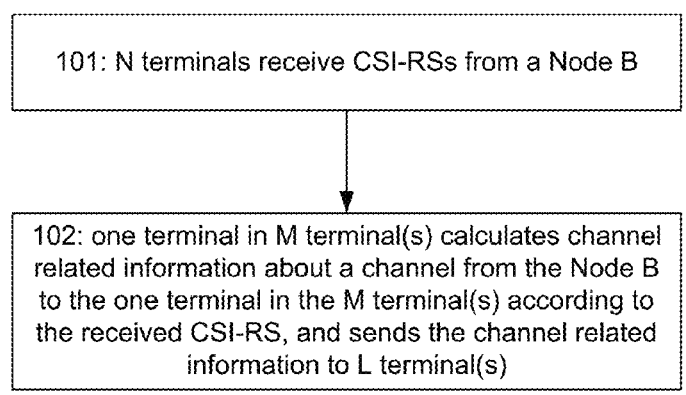
FIG. 2 is an implementation flowchart of a principle of a method according to the present disclosure.

For reception of CSI-RSs from a Node B and calculation of channel related information, a flow of the principle of a method for signalling transmission in a virtual multi-antenna system according to the present disclosure, as shown in FIG. 2, includes:

Step 101: N terminals receive CSI-RSs from a Node B; here, the CSI-RSs are for measuring channel related information of downlinks from the Node B to the N terminals, wherein N is a positive integer larger than or equal to 2; and Step 102: one terminal in M terminal(s) calculates channel related information about a channel from the Node B to the one terminal in the M terminal(s) according to the CSI-RS received by the one terminal in the M terminal(s), and sends the channel related information to L terminal(s).

Here, the M terminal(s) form(s) a subset of the N terminals. M and L are smaller than or equal to N and larger than or equal to 1.

For the situation that L terminal(s) receive channel related information and feed back the channel related information to a Node B, a method for signalling transmission in a virtual multi-antenna system according to the present disclosure includes:

L terminal(s) calculate comprehensive CSI according to received channel related information sent by M terminal(s); and after the L terminal(s) calculate the comprehensive CSI, the L terminal(s) may directly feed back the comprehensive CSI to a Node B, or the L terminal(s) may forward the comprehensive CSI to one terminal in N terminals, and the one terminal in the N terminals feeds back the comprehensive CSI to the Node B.

Here, the M terminal(s) form(s) a subset of the N terminals. M and L are smaller than or equal to N and larger than or equal to 1.

Preferably, the channel related information includes at least one of:

channel information, CSI or a CSI-RS.

Preferably, under the condition that the L terminal(s) are distributed in the N terminals, the L terminal(s) form(s) a subset of the N terminals, and each terminal in the L terminal(s) receives the channel related information from the M terminal(s).

Preferably, under the condition that the L terminal(s) are centralized, online and included in the N terminals, the L terminal(s) form(s) a subset of the N terminals, and L is equal to 1, that is, one terminal in the N terminals receives the channel related information from the M terminal(s).

Preferably, under the condition that the L terminal(s) are centralized, offline and excluded from the N terminals, the L terminal(s) are/is terminal(s) except the N terminals, and L is equal to 1, that is, one terminal except the N terminals receives the channel related information from the M terminal(s).

Preferably, the one terminal except the N terminals may be a centralized processing device not connected to a mobile communication network, which may be a conventional mobile or fixed station device with a capability of communication with a Node B, or may also be an ordinary centralized data processing device, including, but not limited to, a device in form of a relay, a wireless access point, small Node B, home Node B or the like.

A device for signalling transmission in a virtual multi-antenna system according to the present disclosure includes:

a first receiving unit, configured to receive CSI-RSs from a Node B, N being a positive integer larger than or equal to 2; and a first sending unit, configured to calculate channel related information about a channel from the Node B to one terminal in M terminal(s) by the one terminal in M terminal(s) according to the CSI-RS received by the one terminal in M terminal(s), and send the channel related information by the one terminal in M terminal(s) to L terminal(s), wherein the M terminal(s) form(s) a subset of the N terminals, M is smaller than or equal to N and larger than or equal to 1, and L is smaller than or equal to N and larger than or equal to 1.

Preferably, the channel related information includes at least one of: channel information, CSI and the CSI-RS.

A device for signalling transmission in a virtual multi-antenna system according to the present disclosure includes:

a second receiving unit, configured to receive channel related information from one terminal in M terminal(s) by L terminal(s), and calculate comprehensive CSI by the L terminal(s) according to the channel related information, L being smaller than or equal to N and larger than or equal to 1; and a second sending unit, configured to feed back the comprehensive CSI to a Node B by the L terminal(s), or forward the comprehensive CSI to one terminal in N terminals by the L terminal(s), and feed back the comprehensive CSI to the Node B by the one terminal in the N terminals, wherein M is smaller than or equal to N and larger than or equal to 1, the M terminal(s) form(s) a subset of the N terminals, the N terminals are configured to receive CSI-RSs from the Node B, and N is a positive integer larger than or equal to 2.

Preferably, the second receiving unit is further configured to, when the L terminal(s) form(s) a subset of the N terminals, receive the channel related information from the M terminal(s) by each terminal in the L terminal(s).

Preferably, the second receiving unit is further configured to, when the L terminal(s) form(s) a subset of the N terminals and L is equal to 1, receive the channel related information from the M terminal(s) by one terminal in the N terminals.

Preferably, the second receiving unit is further configured to, when the L terminal(s) are/is terminal(s) except the N terminals and L is equal to 1, receive the channel related information from the M terminal(s) by one terminal except the N terminals.

Preferably, the one terminal except in the N terminals is a centralized processing device not connected to a current mobile communication network.

Preferably, the channel related information includes at least one of: channel information, CSI and the CSI-RS.

A virtual multi-antenna system according to the embodiment of the present disclosure includes:

a first sending unit, configured to calculate channel related information about a channel from a Node B to one terminal in M terminal(s) by the one terminal in M terminal(s) according to a CSI-RS received by the one terminal in M terminal(s), and send the channel related information by the one terminal in M terminal(s) to L terminal(s), wherein the M terminal(s) form(s) a subset of N terminals, M is smaller than or equal to N and larger than or equal to 1, and L is smaller than or equal to N and larger than or equal to 1; and a second receiving unit, configured to receive the channel related information from one terminal in the M terminal(s) by the L terminal(s), and calculate comprehensive CSI by the L terminal(s) according to the channel related information, L being smaller than or equal to N and larger than or equal to 1.

The present disclosure is specifically described below with examples.

Figure 3:
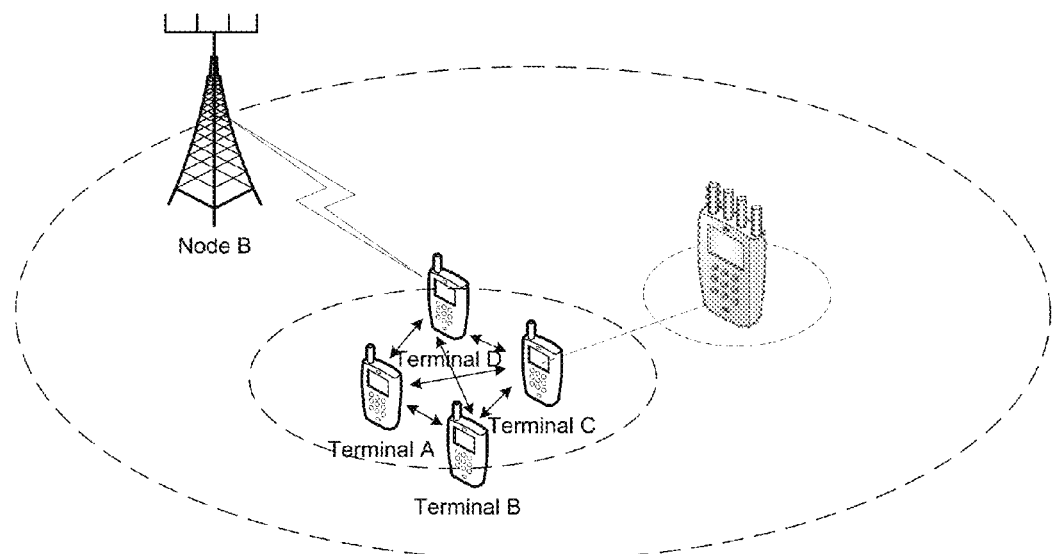
FIG. 3 is a diagram of a signalling transmission network architecture employing a method of the present disclosure.

In a downlink virtual MIMO system, a downlink virtual receiving terminal formed by multiple terminals has more receiving antennae, so that a higher diversity or multiplexing gain may be achieved. For example, when there are four terminals in a scenario shown in FIG. 3, a Node B may adopt at most one layer for transmission directed to each terminal because each of terminals A, B, C and D has only one receiving antenna if SU-MIMO is adopted, while the Node B may adopt at most four layers for transmission in this example because the virtual receiving terminal formed by A, B, C and D has four antennae, therefore, the multiplexing gain is obviously increased. Compared with MU-MIMO, the example has the advantage that in MU-MIMO, interference between users may be avoided only when equivalent channels between the users are strictly orthogonal, but it is often difficult to do so during a practical application, which may greatly reduce performance of MU-MIMO; while when downlink virtual MIMO is adopted, interference between users is avoided, and performance higher than that of MU-MIMO is achieved. A difference from SU-MIMO and MU-MIMO is that data received on own antennae is shared among the terminals in downlink virtual MIMO according to the present disclosure, the sending, receiving and demodulation of the data depend on signalling, and specific signalling transmission scenarios are described below.

Embodiment 1

N terminals receive CSI-RSs from a Node B, wherein the signals are for measuring CSI of downlinks from the Node B to the N terminals, and N is a positive integer larger than or equal to 2; and one terminal in M terminal(s) calculates channel related information about a channel from the Node B to the one terminal in the M terminal(s) according to the CSI-RS received by the one terminal in the M terminal(s), and sends the channel related information to L terminal(s), and the L terminal(s) calculate comprehensive CSI, and directly feed back the comprehensive CSI to the Node B.

The L terminal(s) form(s) a subset of the N terminals, and each terminal in the L terminal(s) receives the channel related information from the M terminal(s).

Figure 4:
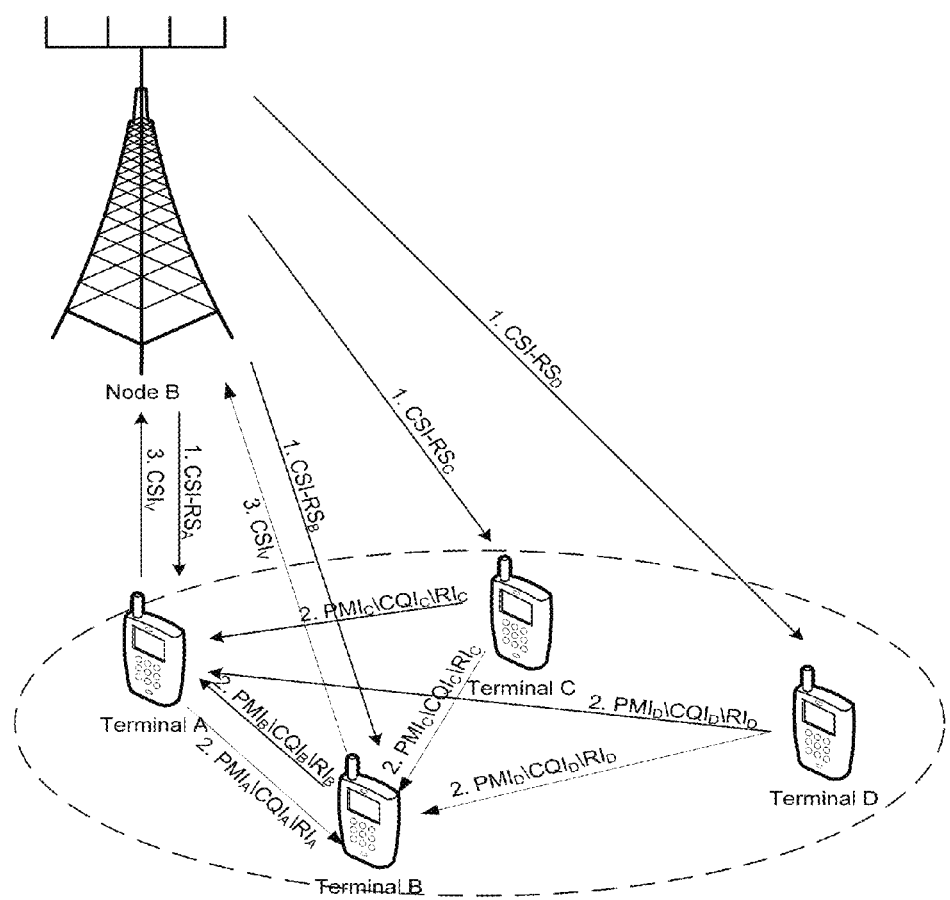
FIG. 4 is a diagram of a signalling transmission network architecture employing a method of the present disclosure according to embodiment 1 of the present disclosure.

As shown in FIG. 4, in downlink virtual MIMO, terminals A, B, C and D jointly form a virtual terminal, and a Node B sends CSI-RSs which respectively are CSI-RSA, CSI-RSB, CSI-RSC and CSI-RSD to terminals A, B, C and D respectively.

Terminals B, C and D calculate CSIB, CSIC and CSID of the downlinks, including PMIB/CQIB/RIB, PMIC/CQIC/RIC and PMID/CQID/RID of the downlinks from the Node B to terminals B, C and D respectively, according to the received CSI-RSB, CSI-RSC and CSI-RSD respectively, and send the CSIB, CSIC and CSID to terminal A;

the terminals A, C and D calculate CSIA, CSIC and CSID of the downlinks, including PMIA/CQIA/RIA, PMIC/CQIC/RIC and PMID/CQID/RID of the downlinks from the Node B to terminals A, C and D respectively, according to the received CSI-RSA, CSI-RSC and CSI-RSD respectively, and send the CSIA, CSIC and CSID to terminal B;

the terminal A calculates comprehensive CSI which is CSIV of a downlink virtual MIMO system according to the CSI received from terminals B, C and D and in combination with the CSIA which is calculated by the terminal A according to CSI-RSA, and feeds back the CSIV to the Node B; and the terminal B calculates comprehensive CSI which is CSIV of the downlink virtual MIMO system according to the CSI received from terminals A, C and D and in combination with CSIA which is calculated by the terminal B according to CSI-RSA, and feeds back the CSIV to the Node B.

Embodiment 2

N terminals receive CSI-RSs from a Node B, wherein the signals are for measuring CSI of downlinks from the Node B to the N terminals, and N is a positive integer larger than or equal to 2; and one terminal in M terminal(s) calculates channel related information about a channel from the Node B to the one terminal in the M terminal(s) according to the CSI-RS received by the one terminal in the M terminal(s), and sends the channel related information to L terminal(s), and the L terminal(s) calculate comprehensive CSI, and directly feed back the comprehensive CSI to the Node B.

Preferably, the L terminal(s) form(s) a subset of the N terminals, and L is equal to 1, that is, one terminal in the L terminal(s) receives the channel related information from the M terminal(s).

Figure 5:
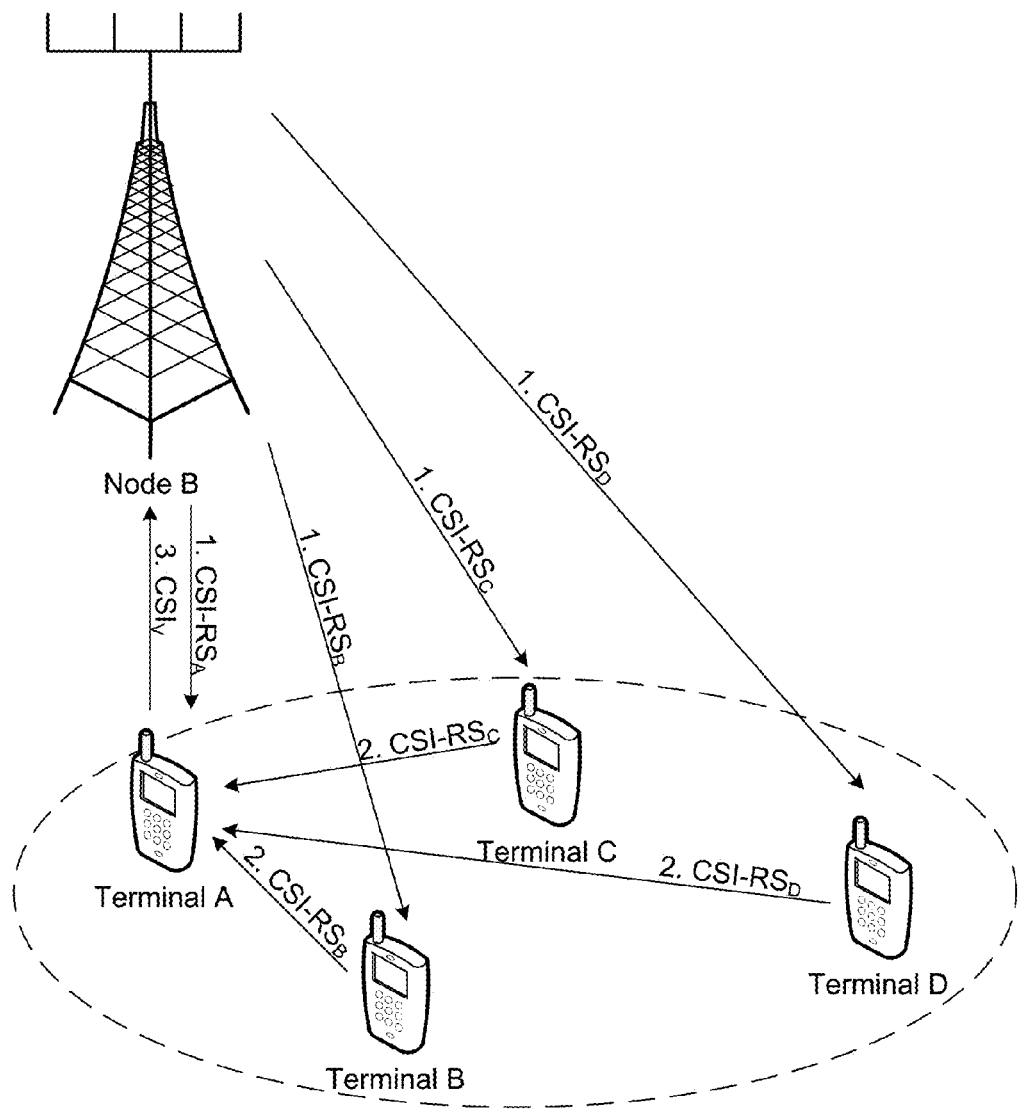
FIG. 5 is a diagram of a signalling transmission network architecture employing a method of the present disclosure according to embodiment 2 of the present disclosure.

As shown in FIG. 5, in downlink virtual MIMO, terminals A, B, C and D jointly form a virtual terminal, and a Node B sends CSI-RSs which respectively are CSI-RSA, CSI-RSB, CSI-RSC and CSI-RSD to terminals A, B, C and D respectively;

the terminals B, C and D send received CSI-RSB, CSI-RSC and CSI-RSD to terminal A respectively; and the terminal A calculates comprehensive CSI which is CSIV of a downlink virtual MIMO system according to the CSI-RSs received from the terminals B, C and D and in combination with the CSI-RSA received by the terminal A, and feeds back the CSIV to the Node B.

Embodiment 3

N terminals receive CSI-RSs from a Node B, wherein the signals are for measuring CSI of downlinks from the Node B to the N terminals, and N is a positive integer larger than or equal to 2; and one terminal in M terminal(s) calculates channel related information about a channel from the Node B to the one terminal in the M terminal(s) according to the received CSI-RS, and sends the channel related information to L terminal(s), and the L terminal(s) calculate comprehensive CSI, and directly feed back the comprehensive CSI to the Node B.

Preferably, the L terminal(s) are/is terminal(s) except the N terminals, and L is equal to 1, that is, one terminal except the L terminal(s) receives the channel related information from the M terminal(s).

In the embodiment, terminals A, B, C and D form a downlink virtual terminal, and terminal E assists terminals A, B, C and D in signalling transmission.

Figure 6:
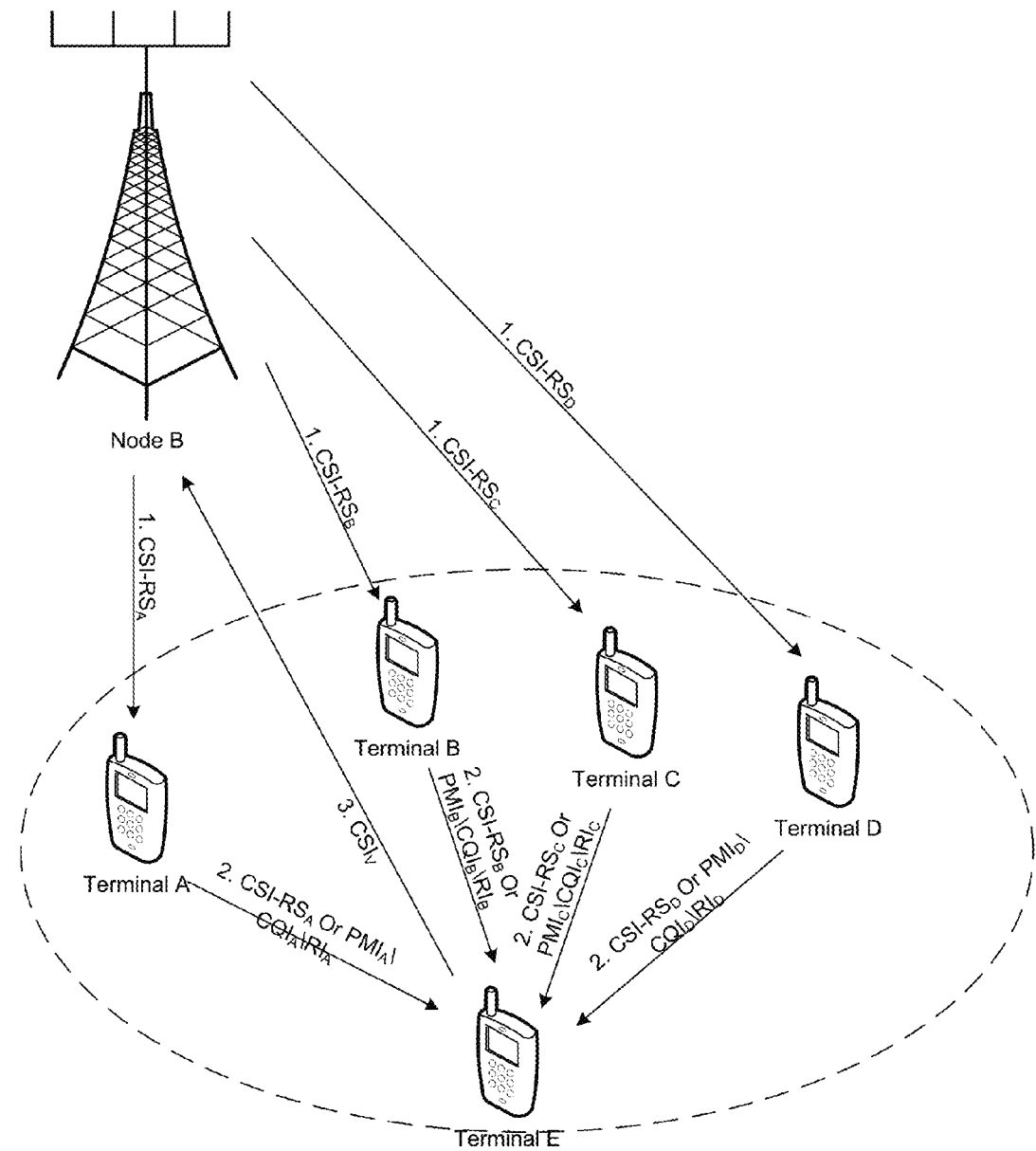
FIG. 6 is a diagram of a signalling transmission network architecture employing a method of the present disclosure according to embodiment 3 of the present disclosure.

As shown in FIG. 6, in downlink virtual MIMO, terminals A, B, C and D jointly form a virtual terminal, and a Node B sends CSI-RSs which respectively are CSI-RSA, CSI-RSB, CSI-RSC and CSI-RSD to terminals A, B, C and D respectively;

the terminals A, B, C and D send received CSI-RSA, CSI-RSB, CSI-RSC and CSI-RSD to terminal E; or, the terminals A, B, C and D calculate CSIA, CSIB, CSIC and CSID of downlinks, including PMIA/CQIA/RIA, PMIB/CQIB/RIB, PMIC/CQIC/RIC and PMID/CQID/RID of the downlinks from the Node B to terminals A, B, C and D respectively, according to received CSI-RSA, CSI-RSB, CSI-RSC and CSI-RSD respectively, and send the CSIA, CSIB, CSIC and CSID to terminal E; and the terminal E calculates comprehensive CSI which is CSIV of a downlink virtual MIMO system according to the CSI-RSs or CSI received from terminals A, B, C and D, and feeds back the CSIV to the Node B.

It should be pointed out that terminal E may be a conventional mobile or fixed station device with a capability of communication with a Node B, or may also be an ordinary centralized data processing device, including, but not limited to, a device in form of a relay, a wireless access point, small Node B, home Node B or the like.

Embodiment 4

N terminals receive CSI-RSs from a Node B, wherein the signals are for measuring CSI of downlinks from the Node B to the N terminals, and N is a positive integer larger than or equal to 2; and one terminal in M terminal(s) calculates channel related information about a channel from the Node B to the one terminal in the M terminal(s) according to the received CSI-RS, and sends the channel related information to L terminal(s), and the L terminal(s) calculate comprehensive CSI, and forward the comprehensive CSI to another terminal, and the another terminal feeds back the comprehensive CSI to the Node B, wherein the M terminal(s) form(s) a subset of the N terminals. M and L are smaller than or equal to N and larger than or equal to 1.

Preferably, the L terminal(s) are/is terminal(s) except the N terminals, and L is equal to 1, that is, the one terminal except the L terminal(s) receives the channel related information from the M terminal(s).

In the embodiment, terminals A, B, C and D form a downlink virtual terminal, and terminal E assists terminals A, B, C and D in signalling transmission.

Figure 7:
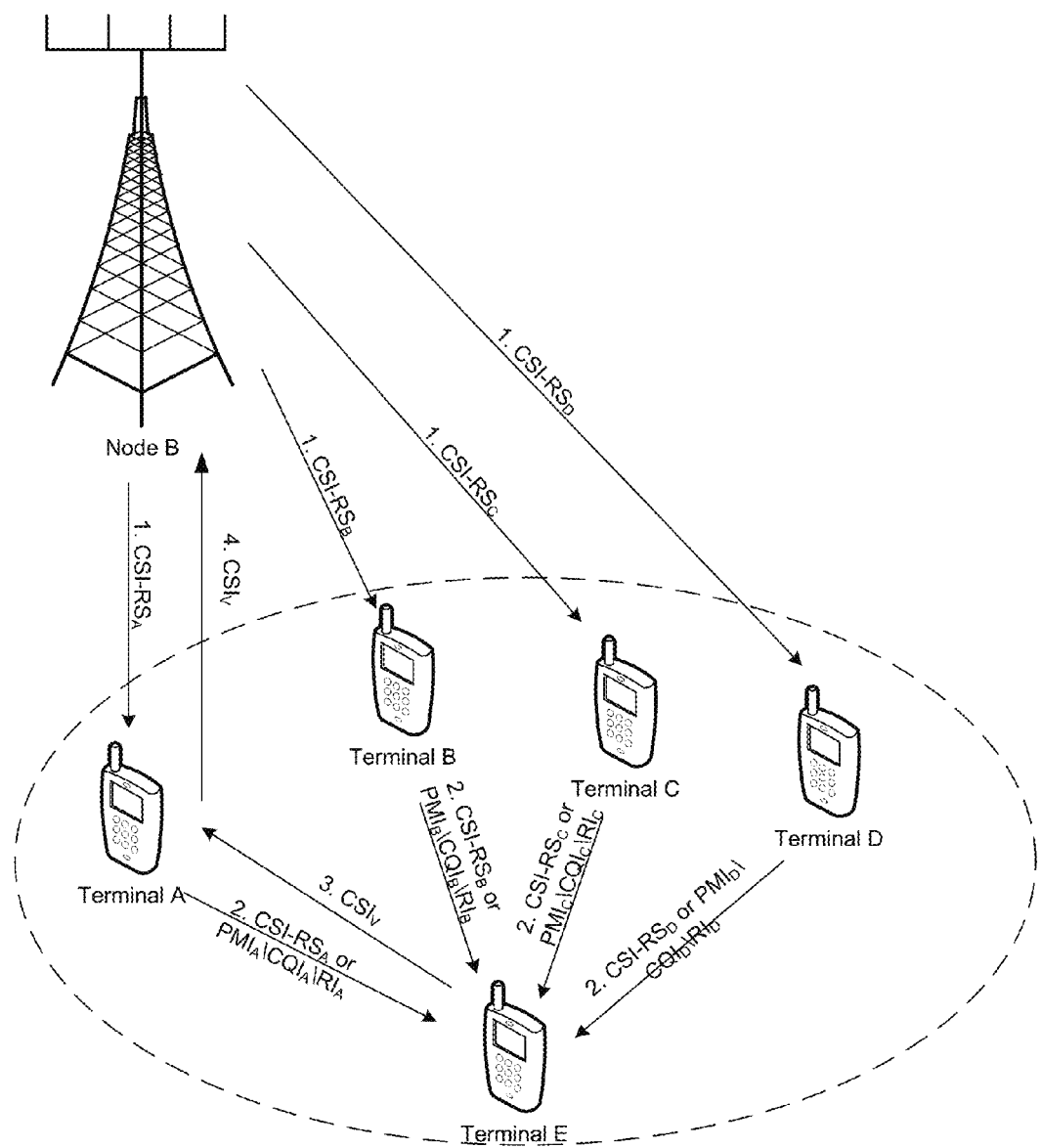
FIG. 7 is a diagram of a signalling transmission network architecture employing a method of the present disclosure according to embodiment 4 of the present disclosure.

As shown in FIG. 7, in downlink virtual MIMO, terminals A, B, C and D jointly form a virtual terminal, and a Node B sends CSI-RSs which are CSI-RSA, CSI-RSB, CSI-RSC and CSI-RSD to terminals A, B, C and D respectively.

Terminals A, B, C and D send received CSI-RSA, CSI-RSB, CSI-RSC and CSI-RSD to terminal E; or, terminals A, B, C and D calculate CSI, i.e. CSIA, CSIB, CSIC and CSID of downlinks, including PMIA/CQIA/RIA, PMIB/CQIB/RIB, PMIC/CQIC/RIC and PMID/CQID/RID of the downlinks from the Node B to terminals A, B, C and D respectively, according to received CSI-RSA, CSI-RSB, CSI-RSC and CSI-RSD respectively, and send the CSI to terminal E; and the terminal E calculates comprehensive CSI which is CSIV of a downlink virtual MIMO system according to the CSI-RSs or CSI received from terminals A, B, C and D, and sends the CSIV to terminal A, and then terminal A feeds back the CSIV to the Node B.

It should be pointed out that terminal E may be a conventional mobile or fixed station device with a capability of communication with a Node B, or may also be an ordinary centralized data processing device, including, but not limited to, a device in form of a relay, a wireless access point, small Node B, home Node B or the like.

The above are only the preferred embodiments of the present disclosure and not intended to limit the scope of protection of the present disclosure.

INDUSTRIAL APPLICABILITY

By the embodiments of the present disclosure, one terminal in M terminal(s) calculates channel related information about a channel from a Node B to the terminal according to a CSI-RS received by one terminal in M terminal(s), and the channel related information is sent to L terminal(s) to calculate comprehensive CSI, so that antenna sharing between users may be implemented, and a network congestion condition may be improved.

What is claimed is:

1. A method for signalling transmission in a virtual multi-antenna system, comprising:
    receiving, by L terminal(s), channel related information from one terminal in M terminal(s), and calculating comprehensive Channel State Information (CSI) according to the channel related information; and
    feeding back, by the L terminal(s), the comprehensive CSI to a Node B, or forwarding, by the L terminal(s), the comprehensive CSI to one terminal in N terminals, and feeding back, by the one terminal in the N terminals, the comprehensive CSI to the Node B; wherein
    L is smaller than or equal to N and larger than or equal to 1, M is smaller than or equal to N and larger than or equal to 1, the M terminal(s) form(s) a subset of the N terminals, the N terminals are configured to receive Channel State Information Reference Signals (CSI-RSs) from the Node B, and N is a positive integer larger than or equal to 2;
    wherein when the L terminal(s) are/is terminal(s) except the N terminals and L is equal to 1, the one terminal except the N terminals receives the channel related information from the M terminal(s);
    wherein the one terminal except in the N terminals is a centralized processing device not connected to a current mobile communication network.

2. The method according to claim 1, wherein when the L terminal(s) form(s) a subset of the N terminals, each terminal in the L terminal(s) receives the channel related information from the M terminal(s).

3. The method according to claim 2, wherein the channel related information comprises at least one of: channel information, CSI and the CSI-RS.

4. The method according to claim 1, wherein when the L terminal(s) form(s) a subset of the N terminals and L is equal to 1, one terminal in the N terminals receives the channel related information from the M terminal(s).

5. The method according to claim 4, wherein the channel related information comprises at least one of: channel information, CSI and the CSI-RS.

6. The method according to claim 1, wherein the channel related information comprises at least one of: channel information, CSI and the CSI-RS.

7. A device for signalling transmission in a virtual multi-antenna system, which is located on a terminal side, the device comprising:
    a second receiving unit, configured to receive channel related information from one terminal in M terminal(s) by L terminal(s), and calculate comprehensive Channel State Information (CSI) by the L terminal(s) according to the channel related information, L being smaller than or equal to N and larger than or equal to 1; and
    a second sending unit, configured to feed back the comprehensive CSI to a Node B by the L terminal(s), or forward the comprehensive CSI to one terminal in N terminals by the L terminal(s), and feed back the comprehensive CSI to the Node B by the one terminal in the N terminals, wherein M is smaller than or equal to N and larger than or equal to 1, the M terminal(s) form(s) a subset of the N terminals, the N terminals are configured to receive Channel State Information Reference Signals (CSI-RSs) from the Node B, and N is a positive integer larger than or equal to 2;
    wherein the second receiving unit is further configured to, when the L terminal(s) are/is terminal(s) except the N terminals and L is equal to 1, receive the channel related information from the M terminal(s) by the one terminal except the N terminals;
    wherein the one terminal except in the N terminals is a centralized processing device not connected to a current mobile communication network.

8. The device according to claim 7, wherein the second receiving unit is further configured to, when the L terminal(s) form(s) a subset of the N terminals, receive the channel related information from the M terminal(s) by each terminal in the L terminal(s).

9. The device according to claim 7, wherein the second receiving unit is further configured to, when the L terminal(s) form(s) a subset of the N terminals and L is equal to 1, receive the channel related information from the M terminal(s) by one terminal in the N terminals.

10. The device according to claim 7, wherein the channel related information comprises at least one of: channel information, CSI and the CSI-RS.

11. A virtual multi-antenna system, comprising:
    a first sending unit, configured to calculate channel related information about a channel from a Node B to one terminal in M terminal(s) by the one terminal in the M terminal(s) according to a Channel State Information Reference Signal (CSI-RS) received by the one terminal in the M terminal(s), and send the channel related information by the one terminal in the M terminal(s) to L terminal(s), wherein the M terminal(s) form(s) a subset of N terminals, M is smaller than or equal to N and larger than or equal to 1, and L is smaller than or equal to N and larger than or equal to 1; and
    a second receiving unit, configured to receive the channel related information from the one terminal in the M terminal(s) by the L terminal(s), and calculate comprehensive Channel State Information (CSI) by the L terminal(s) according to the channel related information, L being smaller than or equal to N and larger than or equal to 1;
    a second sending unit, configured to feed back the comprehensive CSI to a Node B by the L terminal(s), or forward the comprehensive CSI to one terminal in N terminals by the L terminal(s), and feed back the comprehensive CSI to the Node B by the one terminal in the N terminals, wherein M is smaller than or equal to N and larger than or equal to 1, the M terminal(s) form(s) a subset of the N terminals, the N terminals are configured to receive Channel State Information Reference Signals (CSI-RSs) from the Node B, and N is a positive integer larger than or equal to 2;

wherein the second receiving unit is further configured to, when the L terminal(s) are/is terminal(s) except the N terminals and L is equal to 1, receive the channel related information from the M terminal(s) by the one terminal except the N terminals;

wherein the one terminal except in the N terminals is a centralized processing device not connected to a current mobile communication network.

* * * * *